March 16, 1937.　　　F. KOCH　　　2,073,990
CONTAINER
Filed July 11, 1933　　　5 Sheets-Sheet 1

INVENTOR
Felix Koch.
BY
ATTORNEY

March 16, 1937.                F. KOCH                2,073,990
                              CONTAINER
                    Filed July 11, 1933        5 Sheets-Sheet 2

INVENTOR
Felix Koch.
BY
ATTORNEY

Patented Mar. 16, 1937

2,073,990

UNITED STATES PATENT OFFICE 2,073,990

CONTAINER

Felix Koch, Bellevue, Pa., assignor to Pressed Steel Car Company, McKees Rocks, Pa., a corporation of New Jersey Application July 11, 1933, Serial No. 679,870

21 Claims. (Cl. 220—1.5)

The invention pertains to containers and particularly that type of container which comprises an inner and outer shell. The inner shell being the lading receiving or containing portion and is usually separate and distinct from the outer shell and may be of an entirely different material.

The outer shell comprises a rigidifying framework which confines the container and an outer sheathing. The framework forms a support for the inner shell and insulation is preferably placed between the inner shell and the outer sheathing.

The invention lies in the broad idea of the combination of protective framework and a separate inner shell or lading receiving receptacle, in the construction and assembly of the members forming the framework and sheathing, and in the assembly of framework and insulation.

An object of the invention is to provide a container of the character described which is light in weight, rigid, and capable of withstanding handling.

Another object of the invention lies in the particular formation and method of assembling the individual elements of the container so as to facilitate the assembly thereof and to support the contained lading.

A further object of the invention lies in the provision of means for facilitating loading and unloading of the lading as will be hereinafter described.

In the drawings which form a part of the present description Figures 9 to 16 inclusive show a modified form of the container in which Figs. 17 to 24 inclusive show a further modification of the container in which Fig. 23 is an enlarged view taken on the line 23—23 of Fig. 19.

The container may be described generally as comprising a relatively thin walled receptacle, an outer framework and sheathing adapted to support and protect the receptacle with insulation between the outer walls of the contained receptacle and the inner walls of the outer sheathing. The particular embodiments of the invention shown in the drawings and hereinafter described are adapted to the handling of fluids such as milk, the milk being collected at receiving stations, chilled, and placed in the containers for shipment to various points of distribution or to factories producing milk products.

As the containers illustrated are designed to contain from approximately 200 to 400 gallons of fluid it will be obvious that there is a considerable concentrated weight of lading and it is necessary to provide a construction which is sufficiently rigid and strong to support such concentrated weight and which is not so unwieldy as to be difficult to handle. As the containers would be too heavy to be handled manually it is proposed to put supports or a base beneath the container, having sufficient space between the supports, at the sides of the container, to permit the insertion of a lift truck for handling the container.

There are two types of unloading means shown in the drawings, the container shown in Figs. 1 to 8 being adapted for unloading under pressure, that is, an attachment is placed in one wall of the container for connection to an air pressure line and there is a valve in another wall of the container, preferably near the base thereof, through which the milk or other contained fluid is forced by the air pressure. The other method of unloading the containers is shown in Figs. 9 to 24 in which trunnion bearings are mounted on opposite walls of the container and the container is moved by means of a lift truck into position upon a stand having trunnions adapted to be engaged by the bearings in the walls of the container and the container is turned upon these trunnions to pour the fluid from the container.

In cases where the containers are used for handling milk or other fluids which attack ordinary metal sheets, it is proposed to provide an inner receptacle formed of a special metal. The receptacles shown in the drawings are formed of aluminum so as to take advantage of the lightness of such material and its high resistive properties to attack by the lactic acid in milk. Receptacles of this character have relatively little strength to resist distortion and provision has been made for strengthening and supporting the same.

For insulation it is proposed to use balsa wood, which by reason of its cellular formation has a relatively high insulating value and is light in weight. Such insulation has relatively little or no strength to resist distortion and it has been necessary to construct the container outer sheathing and framework to facilitate the insertion of the insulation and to protect and support the insulation.

It will be obvious to those skilled in the art that various changes can be made in the particular details of construction disclosed and hereinafter described without departing from the generic invention and from the scope of the appended claims. Likewise, it will be obvious that various metals or other materials may be used for constructing the inner receptacle and many of the known insulating materials can be substituted for the balsa wood.

Referring now in detail to the drawings where like reference characters refer to like parts and particularly Figs. 1 to 8 of the drawings, reference character 1 indicates a container comprising an inner receptacle 2, an outer sheathing 3 and a supporting and rigidifying framework between the inner receptacle and the outer sheathing. Beneath the bottom of the container and secured thereto are provided supports 4 of sufficient height and spaced to admit the insertion of a lift truck. These supports are preferably mounted adjacent the outer walls of the container so as to take advantage of the strength in the vertical members of the framework. The outer framework comprises a base 8 to which is secured the supports 4. Upon the base 8 are transversely disposed spaced members 5 which are secured to the base as by welding or other fastening means. These members 5 are preferably of channel shape having vertically disposed webs 6 and horizontally disposed flanges 7, the web 6 being of a sufficient height to permit the insertion of insulation to the desired thickness between the inner receptacle 2 and the base 8.

Upon the members 5 is disposed the receptacle 2 which comprises closed side and end walls, bottom and top. There is preferably a relatively large lading receiving opening in the top wall of the receptacle 2 within which opening is fitted a member 9. The member 9 is secured to the tank by welding or other fastening means and has upstanding flanges extending preferably through the outer sheathing. In order to provide a more effective insulation of the container, it is preferable to insert some insulating material between the underside of the receptacle and the members 5 so as to break the metal to metal contact. In doing this it is preferable to use insulation which is not integrally formed with the insulating material between the members 5 and between the underside of the receptacle 2 and the base 8. In the embodiment of the invention as shown in the drawings referred to, a relatively rigid section of insulation is disposed between the members 5 and the underside of the receptacle. By so doing the rigid characteristics of the insulation may be availed of to provide a supplementary support for the receptacle between the main supporting members 5.

Spaced on each side of the receptacle are the framework members 10 which are preferably channel shaped in cross section, extend along each side of the receptacle and across the top thereof as one continuous member, where this is possible and does not interfere with the member 9. Where these framework members such as at 11 would interfere with the member 9 if made continuous across the top of the receptacle, spaced arms or brackets 12 are provided on opposite sides of the member 9 and preferably formed to fit the receptacle, to which brackets the members 11 are secured. Intermediate the members 10 and 11 are the framework members 13 which extend along the sides of the receptacle and partially embrace the top thereof to adjacent the longitudinal centerline. These members 13 are engaged by brackets 14 disposed on opposite sides of the member 9 and are secured thereto. Between the members 10, 11, 13 and the sides of the receptacle 2 and extending for substantially the full length of the receptacle 2 is a relatively rigid insulating material such as is used beneath the receptacle and for substantially the same purpose. The members 10, 11 and 13 are secured to the members 5 by gussets 15. In this manner the members 10, 11, 13 and 5 can be made to closely embrace the receptacle so as to not only form a support therefor but to prevent shifting of the receptacle upon its base or crushing of the same during handling.

Figure 1:
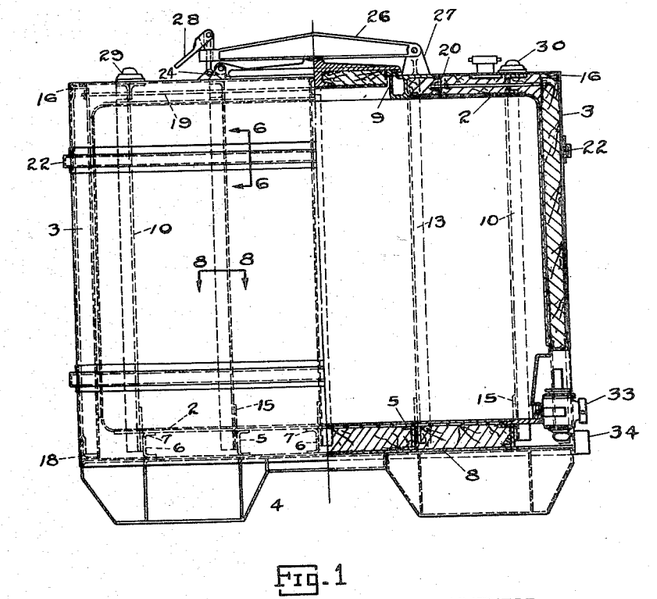
Fig. 1 shows, partially in section, the side elevation of a container.
Figure 2:
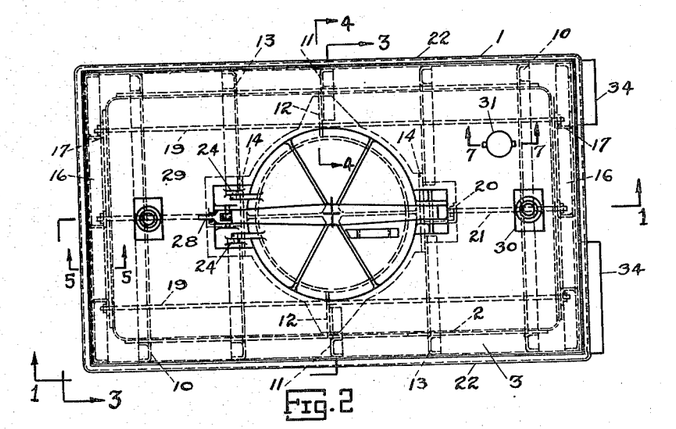
Fig. 2 is a plan view of the container shown by Fig. 1.
Figure 3:
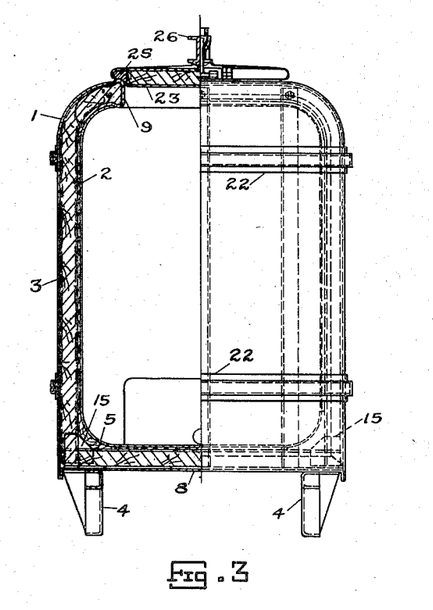
Fig. 3 shows a view taken along line 3—3 of Fig. 2.
Figure 4:
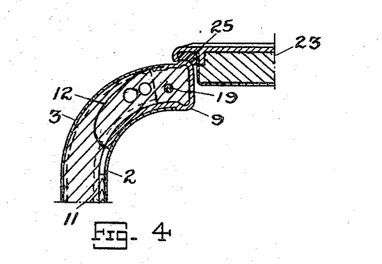
Fig. 4 shows an enlarged view taken along the line 4—4 of Fig. 2.
Figure 5:
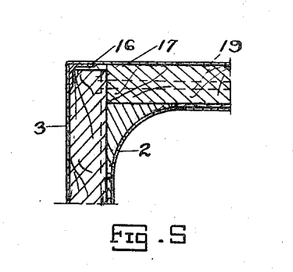
Fig. 5 is an enlarged view taken along the line 5—5 of Fig. 2.
Figure 6:
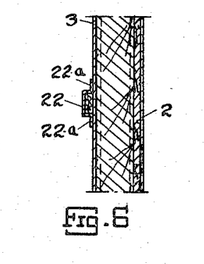
Fig. 6 shows an enlarged view taken along line 6—6 of Fig. 1.
Figure 7:
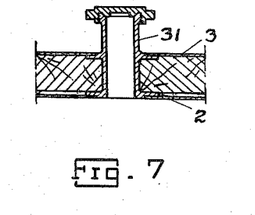
Fig. 7 is an enlarged view taken along line 7—7 of Fig. 2.
Figure 8:
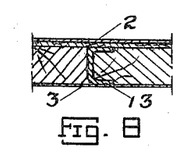
Fig. 8 is an enlarged view taken along line 8—8 of Fig. 1.

Adjacent each end of the receptacle and forming the end frame of the container are provided members 16, which members are preferably of angular cross section having the flanges thereof inwardly disposed in the planes of the end and side walls of the container framework. Between the vertical arms of the members 16, at the ends of the container and embracing the end walls of the receptacle 2 are vertically disposed members 17 which are preferably channel shaped in cross section having the flanges thereof disposed parallel to the ends of the receptacle and the end wall of the container. A relatively rigid section of insulation is also disposed between these members 17 and the end walls of the receptacle 2 so as to span the spaces between the members 17 such as was done at the sides and bottom of the receptacle. The free ends of the arms of the U-shaped members 17 are joined by a member 18 preferably angular in cross section which in turn is secured to the base member 8. The members 17 are secured to the vertical flanges of the members 18 and the vertical flange of the horizontally disposed portion of the member 16. By offsetting the ends of the members 17 as shown in Figs. 1 and 5, the end framework presents an outer face in one plane. The members 17 on opposite ends of the container are preferably joined by tie rods 19 which extend across the top of the container and are bolted to the flanges of the members 17, the arms 12 of the member 9 having suitably disposed openings to permit passage of these tie rods 19 and the brackets 14 of the member 9 having a suitably disposed flange 20 to which are secured short tie rods 21, which in turn are secured to the members 17 as are the tie rods 19.

From the preceding description it will be obvious that a rigid base has been provided for the receptacle 2 and to this base has been secured a rigid framework which defines the container and closely embraces the receptacle 2. The insulation between the framework and the receptacle serves the dual purpose of insulating and supporting the receptacle from and upon the framework.

The assembly of the container is facilitated by the design of the members forming the framework and each part thereof is readily accessible. The members can be riveted or welded together easily and can be fitted to closely embrace the receptacle 2. With the framework so exposed the insulation can be fitted between the members of the framework and secured in place so as to have an outer surface in the same plane as the outer face of the framework.

The outer sheathing may now be placed upon the framework. It is preferable to form the sides and top in one piece, with openings to fit around the filling opening and the attachment for the pressure unloading fitting. The side and top sheathing can then be lowered over the framework and secured thereto by machine screws inserted through the vertical side flanges of the framework members. The bottom edge of the side sheathing being secured to the depending side flanges of the base 8. The end sheathing plates can be cut to shape and fitted to the coplanar flanges of the end frame members 16, 17 and 18.

The container as now described provides an inner receptacle supported upon and embraced by a rigid framework and an outer sheathing covering the framework. The insulation fills the spaces between the inner receptacle and the sheathing and likewise the spaces between the members forming the framework. Although relatively thin plates have been used to form the outer sheathing, the framework is sufficiently rigid to protect the inner receptacle against injury and the insulation being backed up by the outer sheathing is sufficient to support the portions of the inner receptacle between the members forming the framework. To protect the walls of the container it is preferable to provide buffing members 22. These members are shown as formed of light metal plate pressed into a U-shape with oppositely disposed flanges 22a at the free ends of the arms thereof. The space between the arms may be filled with wood and the buffer members secured to the container by means of the said flanges 22a.

The member 9 which preferably extends slightly above the outer sheathing at the top of the container is closed by a lid such as at 23. This lid may be either a pressing or a casting and is hinged to one of the brackets 14 as at 24 and insulating material may be disposed across the inner face of the lid 23 to complete the insulation of the container. A rubber gasket 25 is preferably provided adjacent the inner rim of the lid 23 and adapted to engage with the member 9 to form a tight seal.

In cases where it is desired to unload the container by means of air pressure it is preferable to provide a fastening means for the lid which will not only provide an air tight seal but which will brace the lid. For this purpose the member 26 is provided. This member is hinged to a bracket 27 suitably disposed on the member 9 and oppositely disposed from the bracket 24 to which the lid is hinged. The free end of the locking member 26 being engaged by a suitable member such as at 28 which not only secures the member 26 in place but provides a means for applying pressure to the member 26 so as to force the lid down upon the member 9 and effect a complete seal. If desired, a buffer such as 29 may be provided for the lid when in open position. This buffer comprises a base of cast or pressed metal secured to the framework of the container and preferably provided with a rubber insert to be engaged by the lid when in open position. A suitably disposed buffer 30 may be disposed on the opposite side of the opening for engagement with the locking bar 26 so as to prevent injury to the container when either the door or the locking bar is swung into open position.

In the top of the container and extending down into the receptacle is provided a coupling 31 to which may be secured an air hose and in one of the walls, preferably an end wall, a valve 33 is provided. The wall of the container is recessed to receive this valve so that the valve may be disposed substantially within the plane of the end wall of the container and to complete the protection of this valve a bumper 34 may be secured adjacent the base 8 of the container. The bumper 34 may be of metal or wood as preferred.

Referring now to Figs. 9 to 16 of the drawings wherein is shown a modification of the invention, it will be observed the general principle of design is the same as that previously described but in a simplified form. The container shown therein is provided with trunnion bearings at opposite sides thereof, upon which the container is turned to pour the contained lading, from an opening in the top wall of the container.

Figures 9, 12, 13, 14, 15, 16:
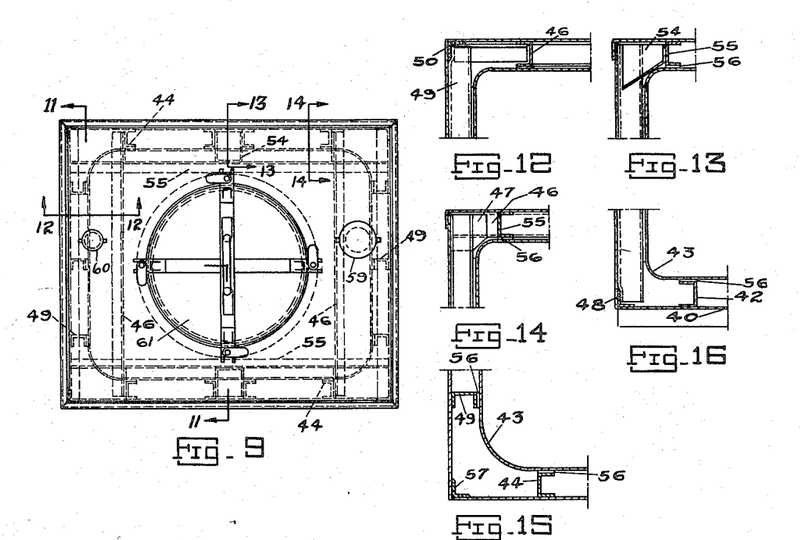
Fig. 9 shows in plan the container.
Fig. 12 shows an enlarged view taken on the line 12—12 of Fig. 9.
Fig. 13 is an enlarged view taken along the line 13—13 of Fig. 9.
Fig. 14 is an enlarged view taken along the line 14—14 of Fig. 9.
Fig. 15 is an enlarged view taken along the line 15—15 of Fig. 10
Fig. 16 is an enlarged view taken along the line 16—16 of Fig. 11.
Figure 10:
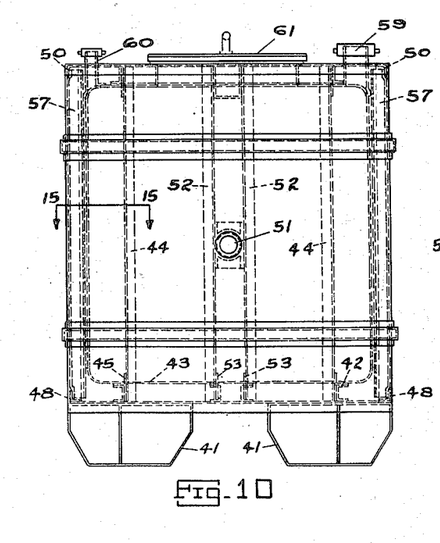
Fig. 10 shows a side elevation of the container shown in Fig. 9.
Figure 11:
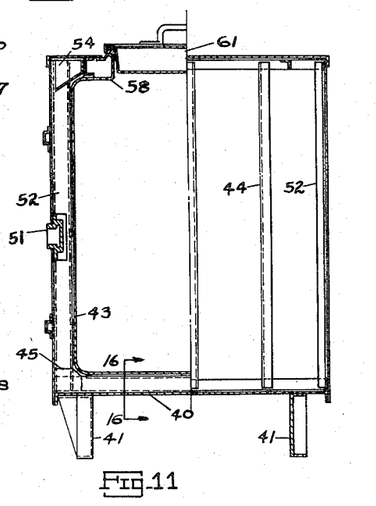
Fig. 11 shows in section a view taken along line 11—11 of Fig. 9.

In Figs. 9, 10, and 11, the container comprises a base 40 to which are secured the supports 41 adjacent each corner of the base. Upon the base are suitably disposed preferably channel shaped members 42 which support the inner shell 43. Adjacent each end of the inner shell 43 and on each side thereof are the vertically disposed members 44 which are preferably channel shaped in cross section. The lower ends of the members 44 are secured to the members 42 preferably by means of the gusset plates 45. The upper ends of the members 44 are tied together by means of a member 46 and gusset plates 47.

Adjacent each end of the base 40 are secured angular shaped members 48. To these members are secured the vertically disposed end members 49. The upper ends of the members 49 are connected by a transversely disposed member 50. The members 48 and 50 are preferably in the same vertical plane and the ends of the members 49 are preferably offset so that the major portion of the members 49 are in the same vertical plane.

At the medial line at each side of the container are the trunnions 51 which are supported between the members 52. These members 52 are vertically disposed, with their lower ends secured to the members 42 as by gussets 53 and their upper ends connected by a tie 54. The tie 54 in turn is preferably secured to a member 55 disposed between the members 46 and extends beyond to join with the members 50.

Between each of the framing members so described and the inner shell 43 are placed insulating members 56. Thus the framing members embrace the inner shell and reinforce it, while being insulated therefrom.

To complete the framework, corner posts 57 are erected at each corner of the base and are preferably of angular cross section having the flanges inwardly disposed and in the plane of the side and end framework. Relatively light steel sheathing is applied to the framework and secured thereto. At the sides of the container the sheathing is cut out to permit the trunnions to project through the sheathing and the bottom edges of the side sheathing is secured to side flanges on the base 40, which are provided for this purpose.

At the top of the container, a vertically disposed flange ring or collar 58 is secured to the inner shell 43 and projects above the adjacent framework. This collar 58 forms a filling opening for the inner shell. Adjacent the end walls of the inner shell are two hollow cylindrical members 59 and 60, which are disposed on opposite ends of the inner shell. The larger member 59 serves as a pouring spout and the member 60 serves to admit air to the shell as the contained fluid is poured from the spout 59. These members 59 and 60 also project above the framework and are closed by suitably formed screw caps.

The top of the container is also covered by metal sheathing which is cut out to fit around the collar 58 and members 59 and 60, each of which project above the sheathing. The top sheathing at the sides of the container is flanged down over the side walls and serves to form a water tight seal as well as to stiffen the container. The collar 58 has a cover 61 removably fastened thereto to close the opening and the cover is preferably insulated. A strip of resilient material is placed between the cover and collar to form a seal as well as to insulate.

As in the case of the container first described the container of Fig. 10 also has insulation between the inner shell and the outer sheathing. When balsa wood is used for this purpose the insulation is cut and fit around the inner shell after the framework is erected and before the sheathing is put on, and this method is also used whenever any other type of insulation is used and applied in sections. In cases where granular or semi-fluid insulation is used it may be placed after the side and end sheathing is applied and before the top sheathing is applied.

Figure 17:
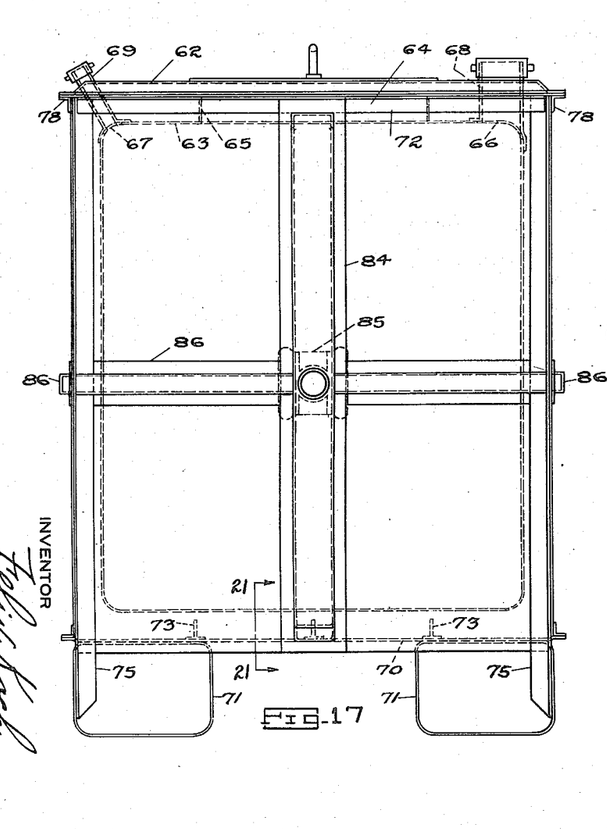
Fig. 17 shows a side elevation of the modified container.

Referring now to Figs. 17 to 24 of the drawings wherein is shown a further modification of the container in which considerable of the framework is eliminated and the several parts of the container are so assembled as to impart a maximum of rigidity. In Fig. 17 the container 62 comprises an inner shell 63, an outer shell 64 and insulation between the inner and outer shells.

The inner shell 63 comprises a lading receiving member preferably formed of metal having closed side walls, end walls, a bottom and top wall. The inner shell as described may, if desired, be formed in one piece but where metal is used it is preferable to use a plurality of parts fastened together. In the top wall and preferably centrally disposed is a filling opening closed by a collar 65, having upstanding flanges projecting above the container as in the previously described container of Fig. 10. On opposite sides of the filling opening are the discharge openings 66 and 67, the opening 66 being closed by a spout 68 securely fastened to the inner shell 63 and projecting above the top wall of the container. The smaller of the two openings 67 is closed by a spout 69 which projects above the top opening and serves to admit air into the container to facilitate the pouring of the contained fluid through the spout 68 when the container is turned upon trunnions as will be hereinafter described. Both of the spouts 68 and 69 are preferably closed by screw caps and a readily removable cover is secured to the outer portion of the collar 65.

The outer shell 64 comprises a base portion 70 beneath which are secured the supporting stands 71, preferably at the four corners of the base. Transversely disposed of the base 70 are rigidifying members 73 preferably of angular cross section and secured to the base. Upon the base 70 is placed the insulation 74 which is preferably of greater depth than the rigidifying members 73 and is preferably of semi-rigid material. At the four corners of the base are erected the vertical corner posts 75 which are preferably of angular cross section and having their flanges disposed inwardly of the container. The corner posts shown in the drawings are formed of T-section with the stem 76 of the T extending along the sides of the container and the head 77 of the T extending along the end walls of the container. These members 75 extend beneath the base 70 and are secured to the stands 71. The upper free ends of the members 75 are joined by the members 78 connected to the heads of the T and the members 72 secured to the stem of the T's. The inner shell 63 is supported upon the insulation 74, insulation 79 is placed around the sides and end walls of the inner shell and joined with the insulation 74 as shown in the drawings, it being preferable to make a jointed connection as shown in Figs. 20 to 24 of the drawings so as to impart a greater rigidity to the structure and to facilitate assembly. Insulation is also secured to the top wall of the container as at 80 and secured to the side and end wall insulation.

Figures 19, 20, 21, 22, 24, 25:
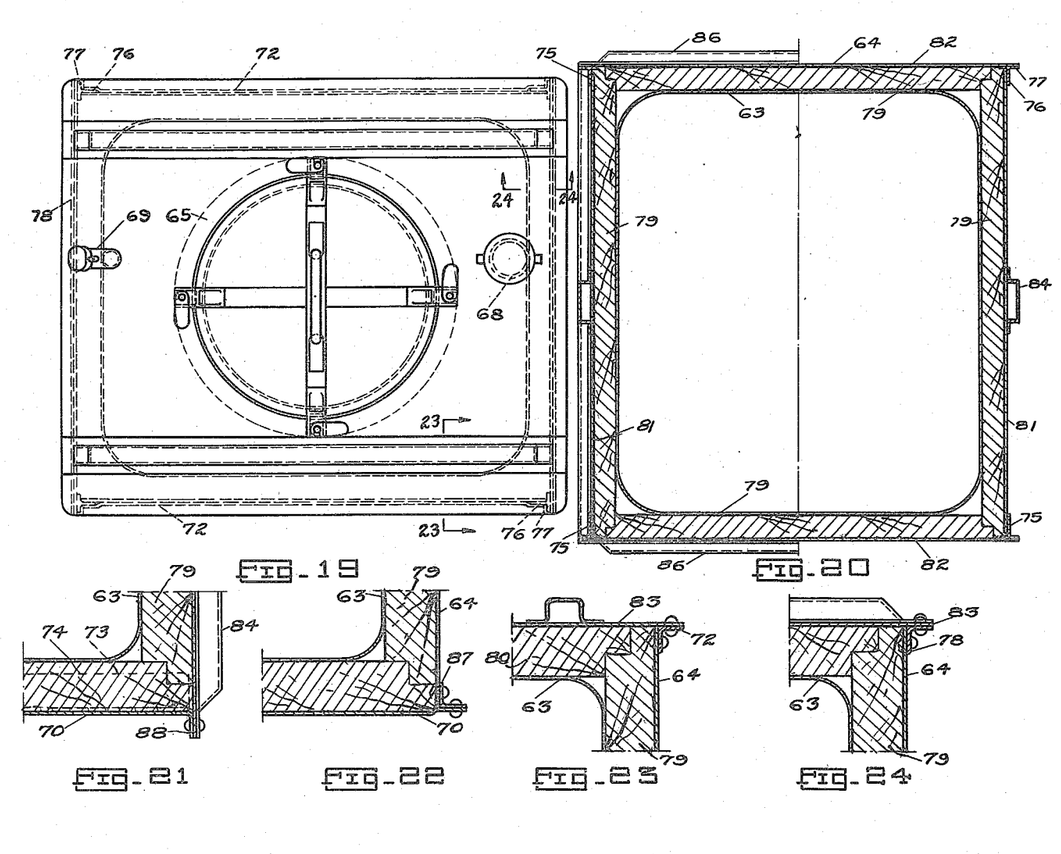
Fig. 19 shows a plan view of the container shown by Fig. 17.
Fig. 20 shows a sectional view taken along the lines 20—20 of Fig. 18.
Fig. 21 is an enlarged view taken on the line 21—21 of Fig. 17.
Fig. 22 is an enlarged view taken along the line 22—22 of Fig. 18.
Fig. 24 is an enlarged view taken along line 24—24 of Fig. 19.

The outer sheathing is secured to the corner posts 75 as shown in Fig. 20 of the drawings. The side sheathing 81 is preferably secured inside the stem of the T and between the T and the insulation and the end sheathing 82 is secured outside the head of the T. The top of the container is covered by sheathing 83 having openings therein to fit over the collar of the filling opening and the spouts of the discharge openings. This sheathing 83 is secured to the top flanges of the members 72 and 78. At each side of the container at the medial line thereof, are vertically disposed members 84 secured to the member 72 and the flange 88 of the base. Within these members 84 are mounted the trunnions 85 upon which the container is turned to discharge the lading. Extending completely around the container is a horizontally disposed brace or tie 86 which is preferably formed of U-shaped members having outwardly diverging flanges on the free ends of the arms of the U and the space between the arms of the U may be filled with wood if desired. This member 86 serves to tie the corner posts together, brace the trunnions and serves as a buffing member.

Figure 18:
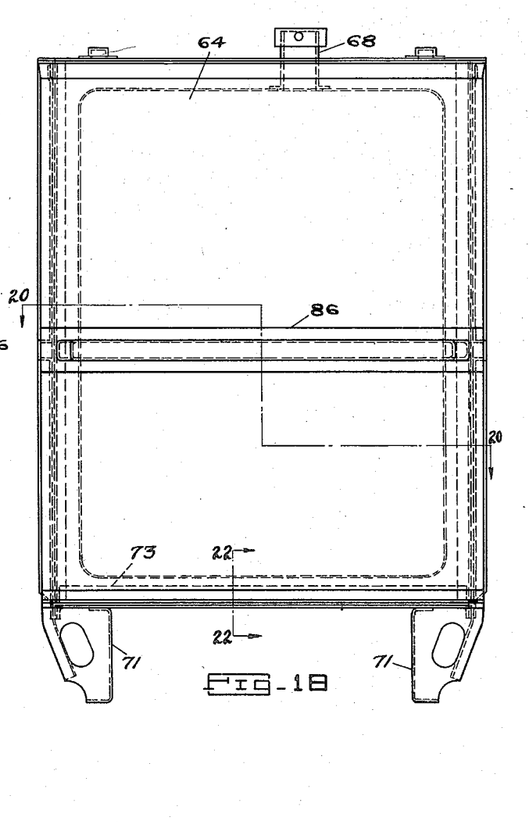
Fig. 18 shows an end elevation of the container shown by Fig. 17.

Along each end of the container at the base are horizontally disposed members 87 preferably of angular section having their vertical flanges connected to the heads of the T of the corner posts 75 and their horizontally disposed flanges connected to the base 10 which extends outwardly for this purpose.

It will be observed that a container so formed comprises an inner shell, an outer framework, an outer sheathing secured to the framework and the space between the inner shell and outer sheathing being filled by insulation which is preferably semi-rigid. The vertically disposed members at the sides of the container and the horizontally disposed members running around the container serve to brace the framework. This container is considerably lighter than the containers previously described and such a construction is preferably used only in the smaller capacities. By using a semi-rigid insulation such as balsa wood and joining the sections of the insulation, the insulation being confined between the framework and partially protected by the vertical and side buffing members, combines with the outer sheathing to provide sufficient protection for the inner shell in containers of smaller capacities.

It will also be observed that this container as constructed permits all of the various members to be riveted together without difficulty. In this manner machine screws may be dispensed with and the cost of manufacture reduced.

Having thus described the invention what I claim as new and desire to secure by Letters Patent is:

1. In a container of the class described, in combination, an inner receptacle, an independent rigid framework embracing the receptacle and an outer sheathing secured to the framework and enclosing the receptacle, trunnion bearings secured to the framework at each side of the container, said bearings providing a support upon which the container may be tilted to discharge the lading.

2. In a container, in combination, a base, transverse rigidifying members secured to the base, a non-metal member of greater thickness than the transverse members and disposed upon the base, an inner receptacle superposed upon the non-metal member, supports secured beneath the base, corner posts secured to the base, angularly disposed flanges on said posts, non-metal members embracing the sides, ends and top of said receptacle, sheathing secured to said corner posts and enclosing said receptacle and non-metal members.

3. In a container, in combination, a closed inner receptacle, insulating material enclosing the receptacle, a metal sheathing enclosing the insulating material, a hollow member extending through said sheathing and insulation and connected to the interior of the receptacle, rigid members forming a framework around the edges of the container, vertically disposed reinforcing members at each side of the container adjacent the medial line thereof and a horizontally disposed member upon at least two walls thereof, said latter member being disposed between the vertical limits of the walls.

4. In a container of the class described, in combination, an inner closed receptacle, a substantially rigid insulating member embracing the walls, base and top of the receptacle, a base member, corner posts secured to the base member, angular framing members connecting the free ends of the posts, sheathing secured to said posts and framing, vertically and horizontally disposed buffing and stiffening members secured upon the walls of the container, said latter members connecting said posts and to said framing and base.

5. In a container, in combination, a closed inner receptacle, an independent outer metal rigidifying covering and framework, trunnion bearings at each side of the container and forming a turning support, and a plurality of openings in the top wall of the container, connecting with the receptacle and forming means to effect loading and unloading of the inner receptacle.

6. In a container of the class described, in combination, an inner closed receptacle, an independent outer framework, openings in the top wall of the container, connected to the exterior of the container and trunnion bearings at the sides of the container upon which the container is rotated to discharge the contained lading through one of said top openings.

7. In a container of the class described comprising, a base, corner framing members secured to the base, angular flanges on said members directed inwardly and outwardly of the walls of said container, angularly flanged members secured to the upper ends of the corner framing and metal sheathing secured to said flanges.

8. In a container of the class described in combination, a base, a rigid frame defining the top, sides and ends of the container and secured to the base, an independent thin walled inner receptacle having a filling and unloading connection, insulating material embracing and reinforcing the receptacle and spacing same from the container base and framework, and sheathing completing the container secured to the framework and retaining the insulation intermediate the framework members.

9. In a container of the class described, in combination, a base plate, rigidifying members secured to the base plate, outer sheathing completing the base plate, an inner receptacle spaced from the outer sheathing and base plate, a filling opening in the inner receptacle, a flanged collar surrounding the opening and projecting above the outer sheathing, framing members independent of the receptacle embracing the sides and top thereof and secured to the rigidifying members, and additional framing members connecting the rigidifying members and flanged collar.

10. In a container of the class described, an inner receptacle having side and end walls, with top and bottom walls connecting the first-named walls, a substantially rigid framework enclosing the receptacle, insulating material between the framework and receptacle, and sheathing secured to the outer face of the framework to complete the container.

11. In a container of the class described, an inner substantially closed receptacle adapted to receive fluid lading, an independent framework formed of inter-connected spaced members completely enclosing the receptacle, and sheathing secured to the outer face of the framework members to complete the container.

12. In a container of the class described, an inner substantially closed receptacle adapted to receive fluid lading, an independent framework formed of inter-connected spaced members completely enclosing the receptacle, insulating material filling the space between the framework and receptacle, and sheathing secured to the outer face of the framework members to complete the container.

13. In a container of the class described, an inner substantially closed receptacle adapted to receive fluid lading, an independent framework formed of inter-connected spaced members completely enclosing the receptacle, substantially rigid insulating material between the receptacle and framework and extending between at least two of the spaced members thereof adjacent each wall of the receptacle, and sheathing secured to the outer face of the framework members to complete the container.

14. In a container, an inner substantially closed receptacle, an independent framework embracing all the walls of the receptacle and formed of spaced inter-connected rigid members, semi-rigid insulation filling the spaces between the members of the framework and of a thickness to extend outward from the receptacle flush with the outer face of said members and sheathing secured to the outer faces of the framework members.

15. In a container, the combination of an inner substantially closed receptacle, an independent frame formed of spaced inter-connected rigid members enclosing the receptacle in spaced relation thereto, sheathing secured to the outer face of the frame and semi-rigid insulation filling the space between the receptacle and sheathing.

16. In a container, the combination of an inner substantially closed receptacle, an independent frame formed of spaced inter-connected rigid members and enclosing the receptacle, semi-rigid fillers disposed between the receptacle and frame so as to extend between two of the spaced members of the frame at the side walls of the receptacle.

17. In a container of the class described, a substantially closed receptacle, a rigid metal frame enclosing the receptacle, sheathing secured to the frame and non-metallic means filling the space between the frame and receptacle.

18. In a container of the class described, a substantially closed inner receptacle, an independent framework enclosing the receptacle and sheathing secured to the outer face of the integral framework.

19. In a container of the class described, an inner receptacle, an independent rigid frame enclosing the receptacle comprising angular corner members, top and bottom members connecting the adjacent corner members at opposite sides of the frame, sheathing secured to the frame to complete the container, an opening in the sheathing forming one wall of the container, a communicating opening in the adjacent wall of the receptacle, a hollow member connecting said openings, and a detachable cover for said sheathing opening.

20. In a container of the class described, an inner closed receptacle, an independent rigid framework enclosing the receptacle, sheathing secured to the outer face of the framework, non-metallic means spacing the receptacle from the framework and sheathing.

21. In a container of the class described, an inner closed receptacle, an independent rigid framework enclosing the receptacle, sheathing secured to the outer face of the framework and semi-rigid means spacing the receptacle from the framework and sheathing.

FELIX KOCH.